United States Patent
Lee et al.

(10) Patent No.: US 9,918,306 B2
(45) Date of Patent: Mar. 13, 2018

(54) METHOD FOR RECEIVING DOWNLINK CONTROL CHANNEL BY MEANS OF TERMINAL IN WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 14/401,012

(22) PCT Filed: May 23, 2013

(86) PCT No.: PCT/KR2013/004529
§ 371 (c)(1),
(2) Date: Nov. 13, 2014

(87) PCT Pub. No.: WO2013/176501
PCT Pub. Date: Nov. 28, 2013

(65) Prior Publication Data
US 2015/0124729 A1    May 7, 2015

Related U.S. Application Data

(60) Provisional application No. 61/650,492, filed on May 23, 2012.

(51) Int. Cl.
*H04W 72/04* (2009.01)
*H04W 24/00* (2009.01)
(Continued)

(52) U.S. Cl.
CPC ......... *H04W 72/042* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2011/0110316 A1    5/2011    Chen et al.
2011/0274066 A1*  11/2011   Tee ....................... H04L 5/001
                                                                370/329
(Continued)

OTHER PUBLICATIONS

LG Electronics, "Discussion on Different TDD UL/DL Configurations for Inter-band CA," 3GPP TSG RAN WG1 Meeting #66bis, Oct. 10-14, 2011, pp. 1-6, R1-113185.
(Continued)

*Primary Examiner* — Huy D Vu
*Assistant Examiner* — Hong Shao
(74) *Attorney, Agent, or Firm* — Birch, Stewart, Kolasch & Birch, LLP

(57) ABSTRACT

The present invention relates to a method for receiving a downlink control channel by means of a terminal in a wireless communication system and to an apparatus for same. More specifically, the present invention relates to a method for detecting downlink control information by means of a terminal in a wireless communication system that supports carrier aggregation, the method comprising: a step of receiving resource region information for an enhanced physical downlink control channel (EPDCCH) from a base station; a step of constructing at least one resource block as a search space for EPDCCH monitoring based on the resource region information; and a step of monitoring the search space to detect downlink control information. The resource region information is a resource region configuration based on cells to be cross-carrier scheduled.

9 Claims, 11 Drawing Sheets

(51) Int. Cl.
  *H04L 5/00* (2006.01)
  *H04L 5/14* (2006.01)
  *H04L 27/26* (2006.01)

(52) U.S. Cl.
  CPC ........... *H04L 5/0094* (2013.01); *H04W 24/00* (2013.01); *H04L 5/1469* (2013.01); *H04L 27/2607* (2013.01)

(56) References Cited

U.S. PATENT DOCUMENTS

| | | | |
|---|---|---|---|
| 2012/0213170 A1* | 8/2012 | Choi | H04L 1/1861 370/329 |
| 2012/0314656 A1* | 12/2012 | Hong | H04L 5/001 370/328 |
| 2013/0039284 A1* | 2/2013 | Marinier | H04L 5/001 370/329 |

OTHER PUBLICATIONS

Panasonic, "PDCCH blind decoding and search space in carrier aggregation," 3GPP TSG-RAN WG1 Meeting #60bis, Apr. 12-16, 2010, pp. 1-5, R1-102016.

Pantech, "Discussion on specification impacts of different TDD UL-DL configuration," 3GPP TSG RAN1 #67, Nov. 14-18, 2011, 6 pages, R1-113829.

Qualcomm Incorporated, "PDCCH for CA: monitoring set, search space and blind decodes," 3GPP TSG RAN WG1 #60bis, Apr. 12-16, 2010, pp. 1-3, R1-102318.

* cited by examiner

FIG. 2
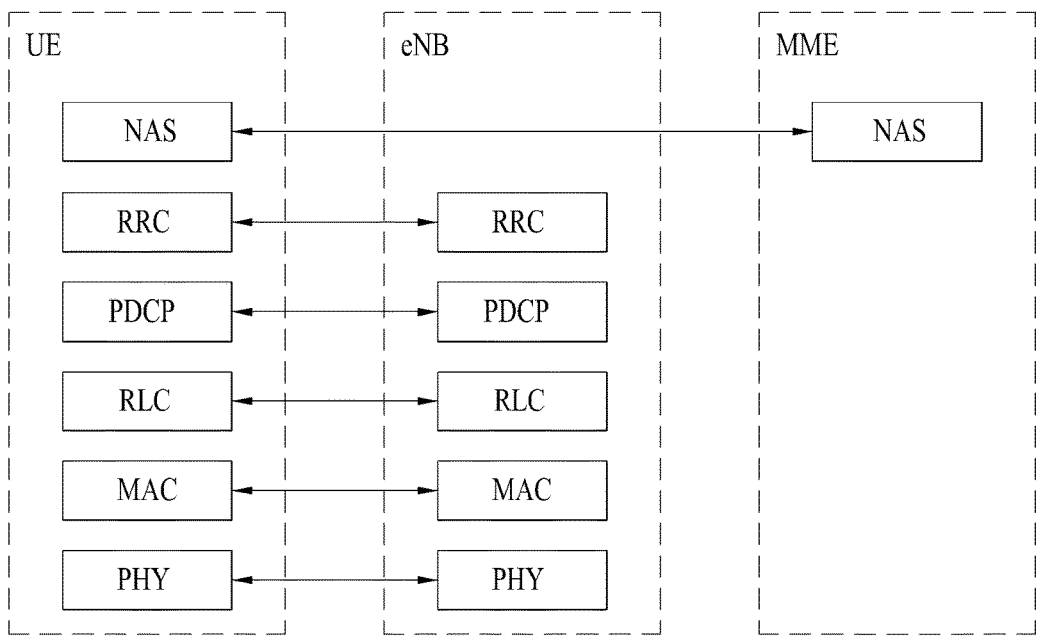
(a) control-plane protocol stack
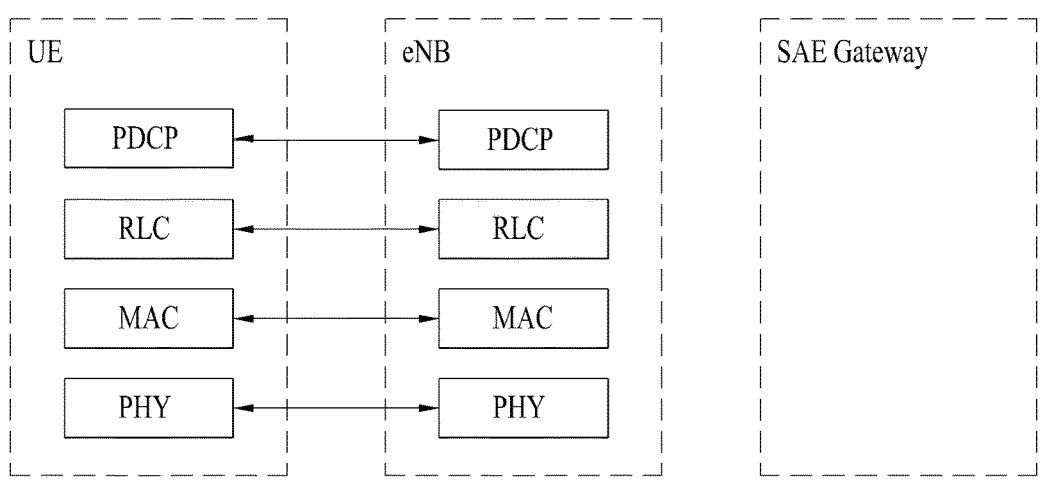
(b) user-plane protocol stack FIG. 7
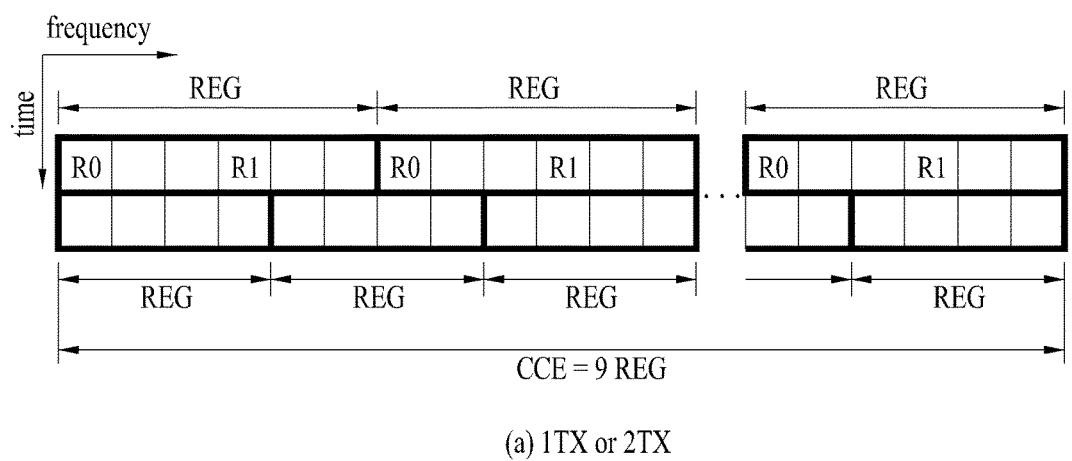
(a) 1TX or 2TX
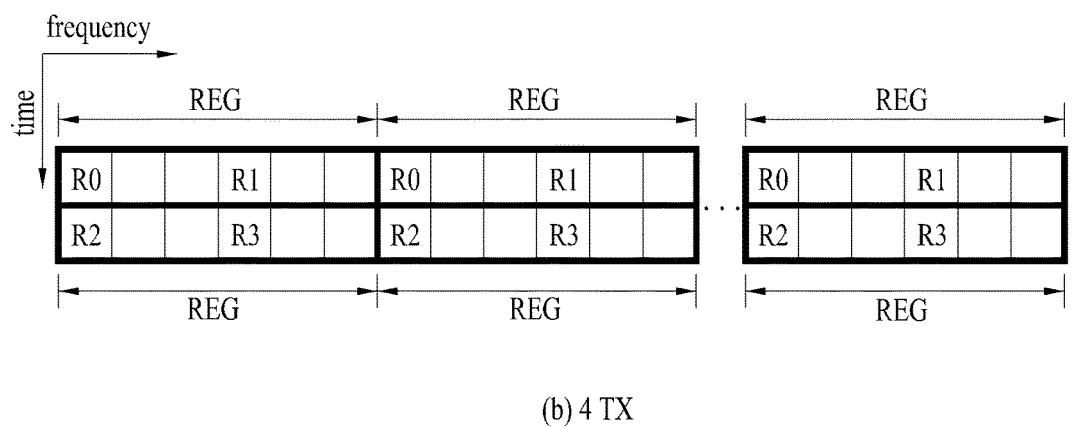
(b) 4 TX independent UL-DL configuration

METHOD FOR RECEIVING DOWNLINK CONTROL CHANNEL BY MEANS OF TERMINAL IN WIRELESS COMMUNICATION SYSTEM AND APPARATUS FOR SAME

CROSS REFERENCE TO RELATED APPLICATIONS

This application is the National Phase of PCT International Application No. PCT/KR2013/004529, filed on May 23, 2013, which claims priority under 35 U.S.C. 119(e) to U.S. Provisional Application No. 61/650,492, filed on May 23, 2012, all of which are hereby expressly incorporated by reference into the present application.

TECHNICAL FIELD

The present invention relates to wireless communication system, and more particularly, to a method for enabling a user equipment to receive a downlink control channel in a wireless communication system and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the conventional problem is to provide a method for enabling a user equipment to receive a downlink control channel in a wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for enabling a user equipment to detect downlink control information in a wireless communication system that supports carrier aggregation comprises the steps of receiving resource region information for an enhanced physical downlink control channel (EPDCCH) from a base station; configuring at least one resource block as a search space for EPDCCH monitoring on the basis of the resource region information; and monitoring the search space to detect downlink control information, wherein the resource region information is resource region configuration based on cells which are cross-carrier scheduled.

Moreover, the resource region configuration is the configuration related to a size of a resource region determined by the number of cells to which cross-carrier scheduling is applied.

Moreover, the resource region configuration is the configuration related to a size of a resource region determined by the number of cells to which cross-carrier scheduling is applied on a specific time. Preferably, uplink-downlink configuration is respectively applied to the respective cells.

Also preferably, the cells include a scheduling cell and at least one scheduled cell, and the number of cells to which cross-carrier scheduling is applied is the number of at least one cell scheduled through the scheduling cell at the specific time. The scheduling cell is a primary cell, and the scheduled cell is a secondary cell.

Moreover, the at least one resource block constituting the search space is at least one subframe or radio frame.

Moreover, the resource region information is received through at least one of system information signaling, upper layer signaling and physical layer signaling, which are previously defined.

To solve the aforementioned technical problems, according to another aspect of the present invention, a ser equipment for detecting downlink control information in a wireless communication system that supports carrier aggregation comprises a radio frequency (RF) unit; and a processor, wherein the processor is configured to receive resource region information for an enhanced physical downlink control channel (EPDCCH) from a base station, configure at least one resource block as a search space for EPDCCH monitoring on the basis of the resource region information and monitor the search space to detect downlink control information, and the resource region information is resource region configuration based on cells which are cross-carrier scheduled.

Advantageous Effects

According to the present invention, downlink control information of the user equipment may effectively be detected in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and an E-UTRAN based on the 3GPP radio access network standard;

FIG. 7 is a diagram illustrating a resource unit used to configure a downlink control channel in an LTE system;

BEST MODE FOR CARRYING OUT THE INVENTION

Figure 1:
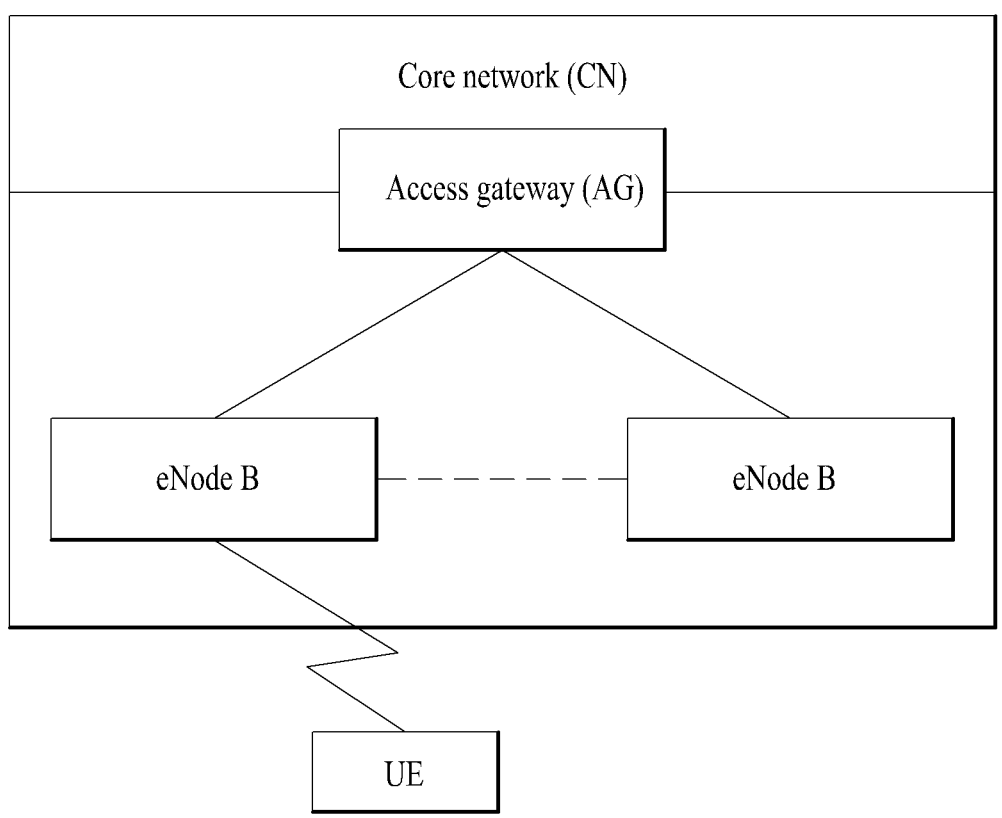
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
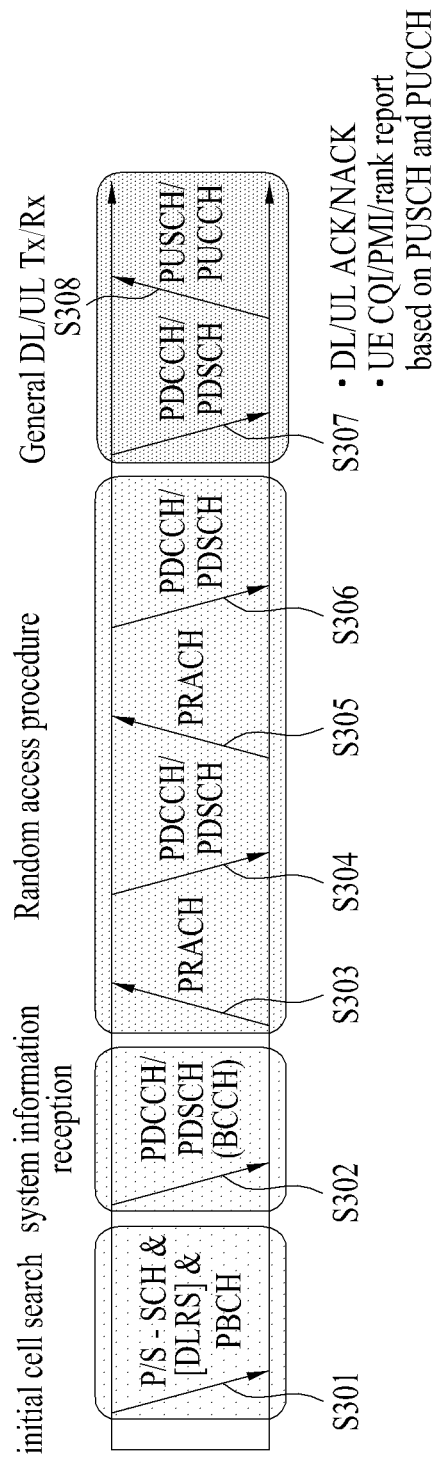
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
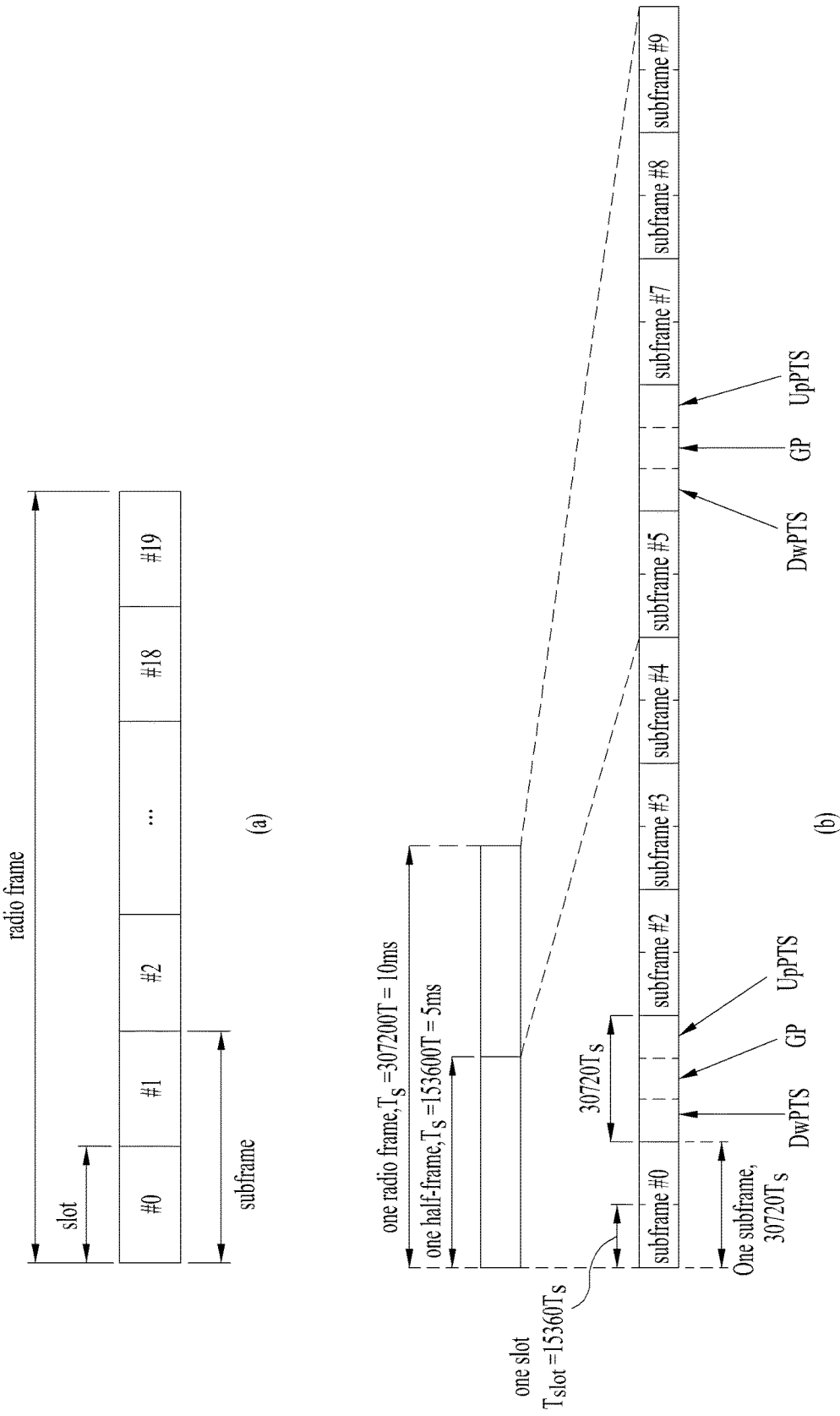
FIG. 4 is a diagram illustrating a structure of a downlink radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
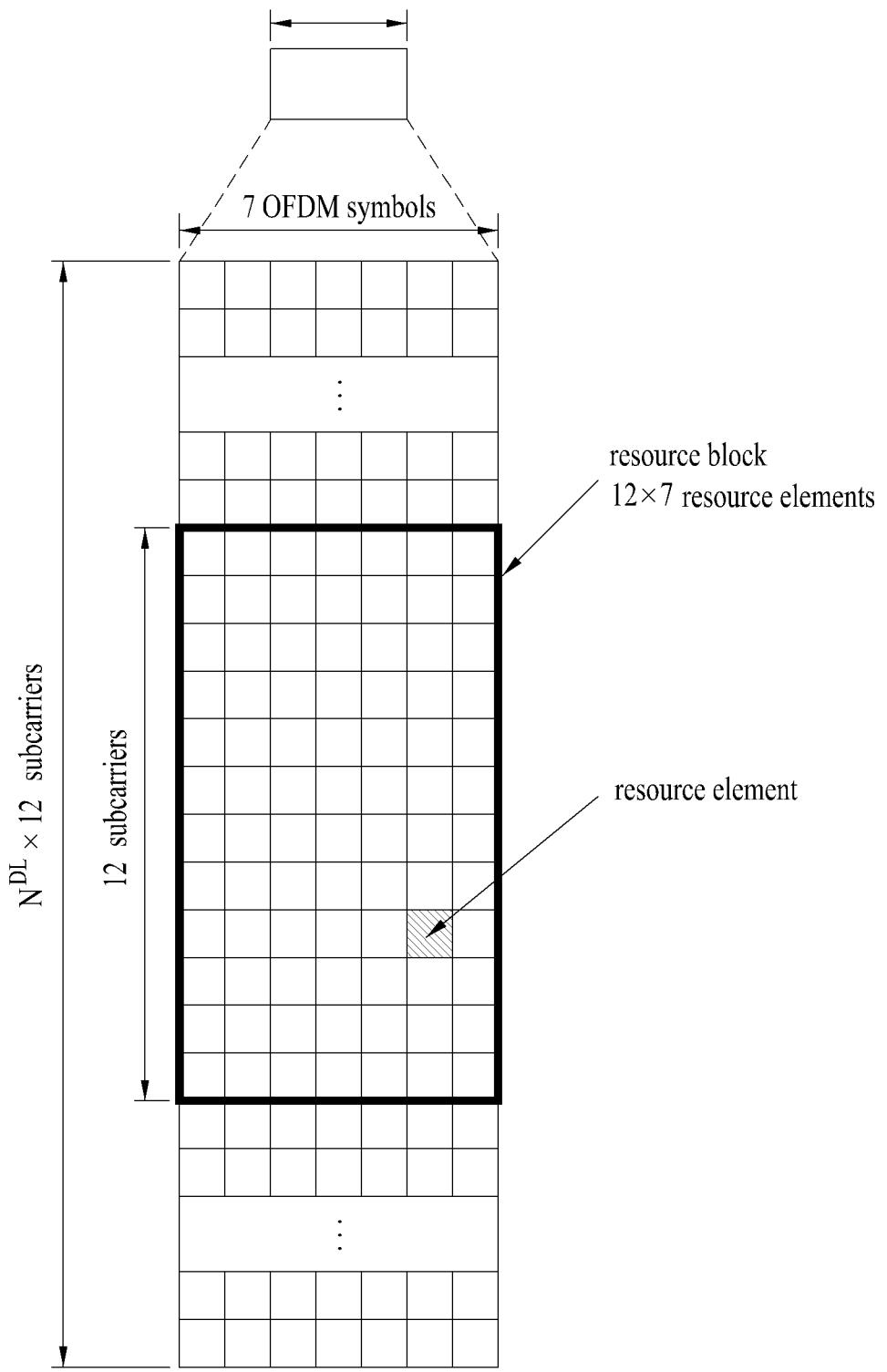
FIG. 5 is a diagram illustrating an example of a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The

TABLE 1

| | Normal cyclic prefix In downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | number $N_{RB}^{DL}$ of resource blocks included in the downlink slot depends on a downlink transmission bandwidth configured in the cell.

Figure 6:
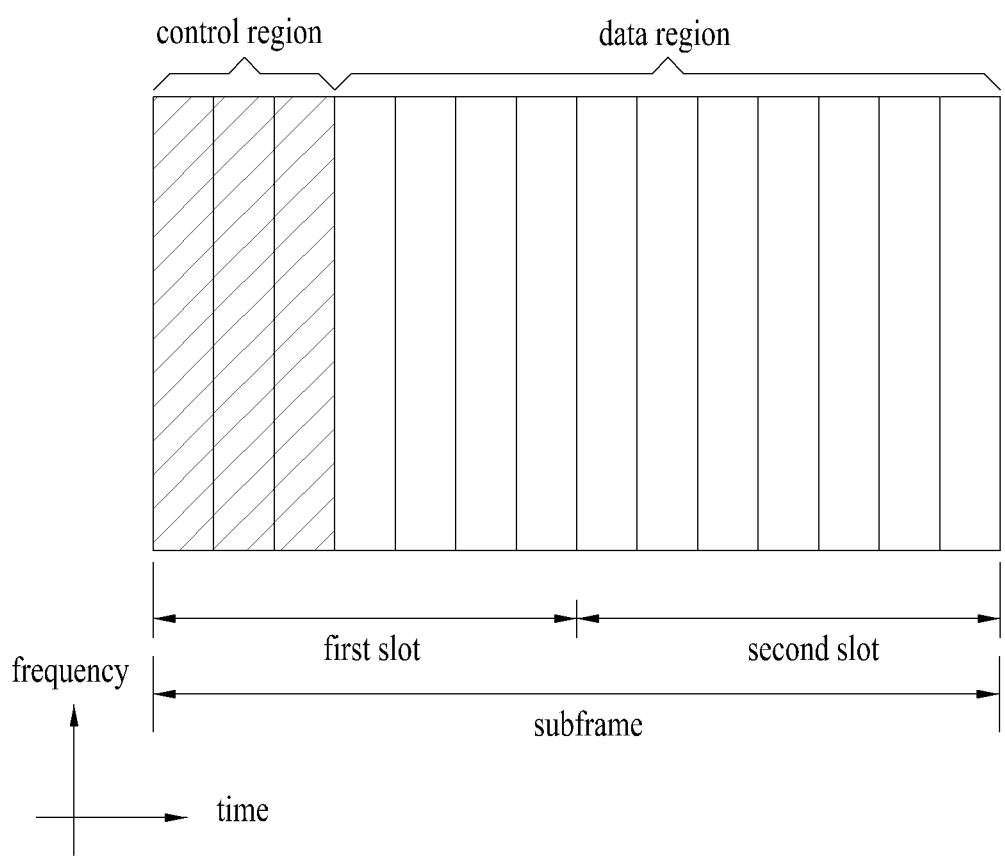
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

FIG. 7 is a diagram illustrating a resource unit used to configure a downlink control channel in an LTE system. In particular, FIG. 7(a) illustrates that the number of transmitting antennas is 1 or 2, and FIG. 7(b) illustrates that the number of transmitting antennas is 4. Although RS patterns of FIG. 7(a) and FIG. 7(b) are different from each other in accordance with the number of transmitting antennas, a configuration method of a resource unit related to a control channel is equally applied to FIG. 7(a) and FIG. 7(b).

Referring to FIG. 7, a basic resource unit for the downlink control channel is a resource element group (REG). The REG includes four neighboring resource elements excluding the reference signal (RS). The REG is illustrated with a solid line. The PCFICH and the PHICH include four REGs and three REGs, respectively. The PDCCH is configured in a unit of CCE (control channel element), one CCE including nine REGs.

The user equipment is configured to identify $M^{(L)}(\geq L)$ number of CCEs, which are continuous or arranged in accordance with a specific rule, thereby identifying whether PDCCH of L number of CCEs is transmitted thereto. A plurality of values of L may be considered by the user equipment to receive the PDCCH. CCE aggregations that should be identified by the user equipment to receive the PDCCH will be referred to as a search space. For example, the LTE system defines the search space as illustrated in Table 1 below.

TABLE 1

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L represents the number of CCEs constituting the PDCCH, $S_k^{(L)}$ represents a search space of the CCE aggregation level L, and $M^{(L)}$ is the number of candidate PDCCH that should be monitored at the search space of the aggregation level L.

The search space may be divided into a UE-specific search space that allows access for only a specific user equipment and a common search space that allows access for all user equipments within a cell. The user equipment monitors a common search space of the CCE aggregation levels of 4 and 8, and monitors a UE-specific search space of the CCE aggregation levels of 1, 2, 4 and 8. The common search space and the UE-specific search space may be overlapped with each other.

Furthermore, in a PDCCH search space given to a random user equipment for each CCE aggregation level value, the location of the first CCE (i.e., CCE having the smallest index) is varied per subframe depending on the user equipment. This will be referred to as PDCCH search space hashing.

The CCEs may be distributed in a system band. In more detail, a plurality of CCEs which are logically continuous may be input to an interleaver. The interleaver performs interleaving for the input CCEs in a unit of REG. Accordingly, frequency/time resources constituting one CCE are physically distributed in the entire frequency/time domain within the control region of the subframe. Finally, although the control channel is configured in a unit of CCE, interleaving is performed in a unit of REG, whereby frequency diversity and interference randomization gain may be maximized.

Figure 8:
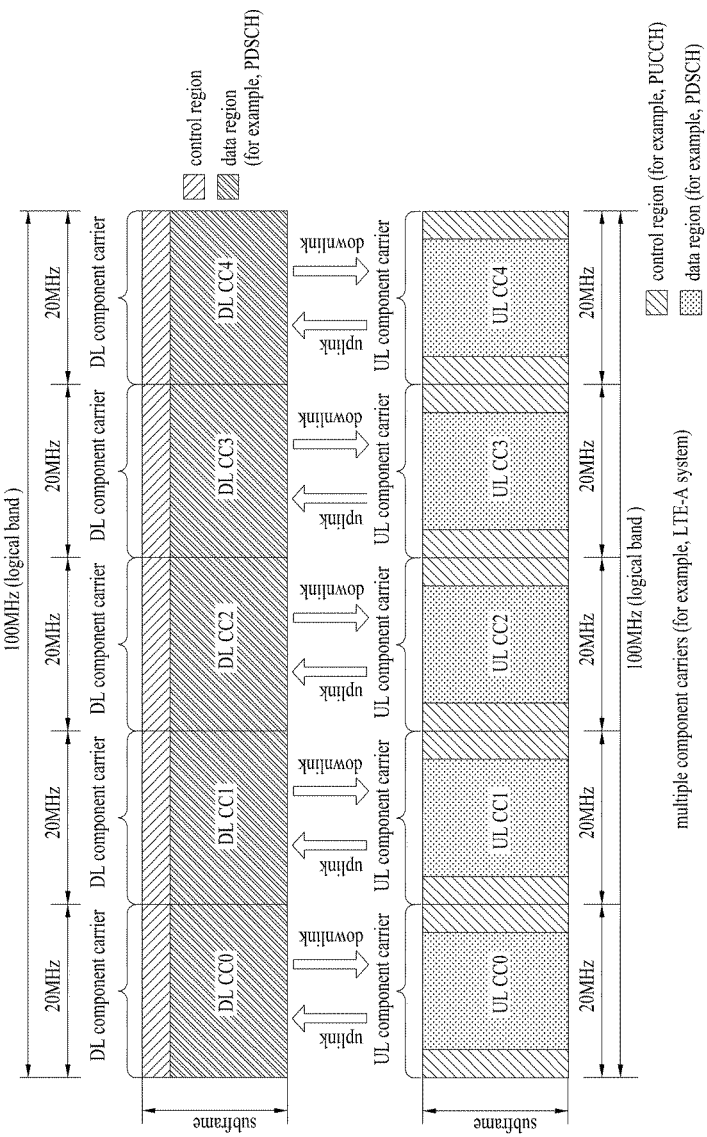
FIG. 8 is a diagram illustrating a carrier aggregation (CA) communication system.

FIG. 8 is a diagram illustrating a carrier aggregation (CA) communication system.

Referring to FIG. 8, a plurality of uplink/downlink component carriers (CC) may be collected to support wider uplink/downlink bandwidths. The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs (SCCs). The PCC may be used such that the user equipment may perform an initial connection establishment procedure or connection re-establishment procedure. The PCC may refer to a cell indicated during a handover procedure. The SCC may be configured after RRC connection is established, and may be used to provide an additional radio resource. For example, if cross-carrier scheduling (or cross-CC scheduling) is used, the PDCCH for downlink allocation is transmitted to DL CC#0, and the corresponding PDSCH may be transmitted to DL CC#2. The terminology "component carrier" may be replaced with an equivalent another terminology (for example, carrier, cell, etc.).

For cross-carrier scheduling, a carrier indicator field (CIF) is used. Configuration of the presence or not of the CIF within the PDCCH may be enabled by upper layer signaling (for example, RRC signaling) semi-statically and user equipment-specifically (or user equipment group-specifically). The base line of PDCCH transmission may be summed up as follows.

CIF disabled: the PDCCH on the DL CC allocates PDSCH resource on the same DL CC or PUSCH resource on one linked UL CC.
No CIF
CIF enabled: the PDCCH on the DL CC may allocate PDSCH or PUSCH resource on one DL/UL CC of a plurality of aggregated DL/UL CCs by using the CIF.
LTE DCI format extended to have CIF
CIF (if configured) is a fixed x-bit field (for example, x=3)
CIF (if configured) location is fixed regardless of DCI format size.

If the CIF exists, the base station may allocate a PDCCH monitoring DL CC (set) to reduce complexity of BD in view of the user equipment. For PDSCH/PUSCH scheduling, the user equipment may detect and decode the PDCCH on the corresponding DL CC only. Also, the base station may transmit the PDCCH through monitoring DL CC (set) only. The monitoring DL CC set may be set user equipment-specifically, user equipment group-specifically or cell-specifically.

Figure 9:
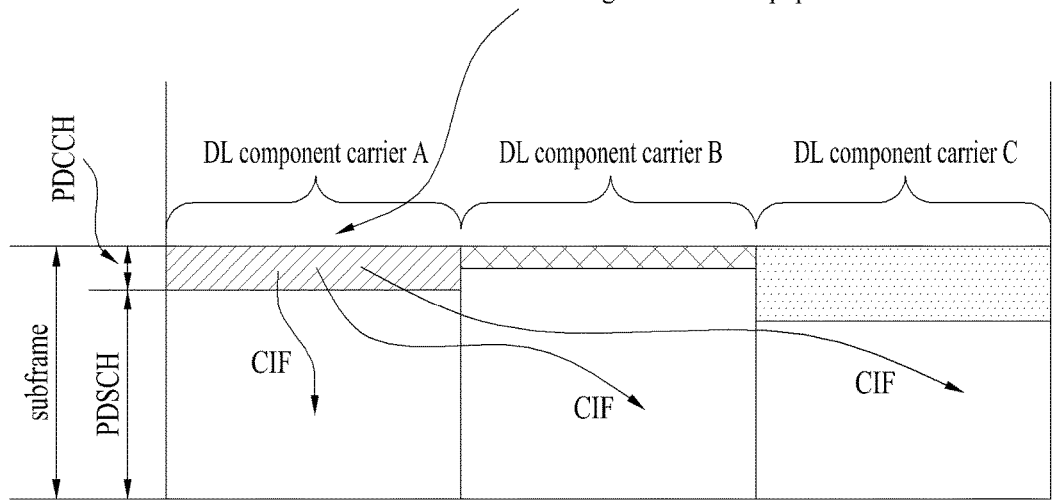
FIG. 9 is a diagram illustrating that three DL CCs are aggregated and DL CC A is set to monitoring DL CC.

FIG. 9 illustrates that three DL CCs are aggregated and DL CC A is set to a monitoring DL CC. If the CIF is disabled, each DL CC may transmit the PDCCH that schedules a PDSCH of each DL CC without CIF in accordance with the LTE PDCCH rule. On the other hand, if the CIF is enabled by upper layer signaling, only the DL CC A may transmit the PDCCH, which schedules the PDSCH of another CC as well as the PDSCH of the DL CC A, by using the CIF. The PDCCH is not transmitted from the DL CC B and DL CC C which are not set to the PDCCH monitoring DL CC.

As described above, in the 3GPP LTE/LTE-A system, first n number of OFDM symbols of the subframe are used for transmission of PDCCH, PHICH, and PCFICH, which are physical channels for transmission of various kinds of control information, and the other OFDM symbols are used for PDSCH transmission. The number of symbols used for control channel transmission for each subframe is forwarded to the user equipment dynamically through the physical channel such as PCFICH, or semi-statically through RRC signaling. The value of n may be set to one symbol to maximum four symbols in accordance with subframe features and system features (FDD/TDD, system band, etc.). Meanwhile, in the LTE system according to the related art, the PDCCH which is a physical channel for DL/UL scheduling and transmitting various kinds of control information has limitation in that the PDCCH is transmitted through limited OFDM symbol(s). Accordingly, introduction of an enhanced PDCCH (E-PDCCH) multiplexed with the PDSCH more freely in accordance with FDM/TDM mode may be considered instead of the control channel structure that the existing PDCCH is transmitted through the OFDM symbol separate from the PDSCH.

Accordingly, the present invention suggests a method for dynamically changing a usage of a radio resource (for example, uplink resource or downlink resource), which is previously set under an environment to which a carrier aggregation (CA) scheme is applied, for the purpose of downlink communication or uplink communication in accordance with change of a load state on the system.

In case of the LTE system (Rel-8/9/10), a reference signal and a physical control channel are transmitted at a subframe set for a downlink on a specific cell or a component carrier (CC). Based on this, conventional legacy user equipments may be assured of physical downlink/uplink data channel transmission (that is, backward compatibility) performed through the specific cell. For example, the reference signal in the present invention may be one of, but not limited to, CRS, CSI-RS, and DM-RS, and the physical control channel may be one of PDCCH, PCFICH, and PHICH.

However, in the future system, a cell or component carrier (CC); which is newly defined, may be introduced due to reasons such as improvement of inter-cell interference problem, improvement of extendibility of the cell or component carrier, and increase of degree of freedom in application of advanced technology. In other words, a cell or component carrier (CC) may be introduced, which is newly defined so as not to transmit all or some of physical channels or reference signals transmitted on a cell or component carrier (CC) having backward compatibility with the conventional legacy user equipment. In the present invention, for convenience of description, such a cell or component carrier (CC) will be defined as a new carrier type (NCT).

In other words, unlike the cell or component carrier (CC) which has compatibility with the legacy user equipment, in the NCT which is the newly defined cell or component carrier (CC), CRS transmission of high density may basically be omitted or reduced.

Also, in the NCT, physical channel reception and channel estimation operation may be performed on the basis of CSI-RS which may be set at relatively lower density than that of DM-RS transmitted UE-specifically or CRS transmission, whereby advantages such as reduction of overhead of the reference signal and improvement of physical channel reception performance may be obtained. For example, in the NCT, physical channel reception operation may be performed using downlink data transmission modes (for example, TM mode #8, TM mode #9) operated based on DM-RS of the conventional downlink data transmission modes (TMs).

Also, even in the NCT, synchronization signals (for example, PSS, SSS) for synchronization acquisition on time/frequency resource domains or various reference signals for channel estimation (for example, RRM, REM) between the base station and the user equipment may be transmitted. For example, although the synchronization signal transmitted in the NCT may be implemented in the same structure as that on the conventional system, the synchronization signal may be implemented in a structure different from that on the conventional system.

Additionally, in the NCT, CRS may be transmitted for the purpose of synchronization signal demodulation. In this case, the corresponding CRS may be transmitted on the basis of at least one of a specific period which is previously set, a specific location on the frequency domain, a resource on a specific antenna port, and a specific sequence resource. For example, the CRS transmitted for the purpose of synchronization signal demodulation may be defined so as not to be used for demodulation of a physical control channel or a physical data channel.

Figure 10:
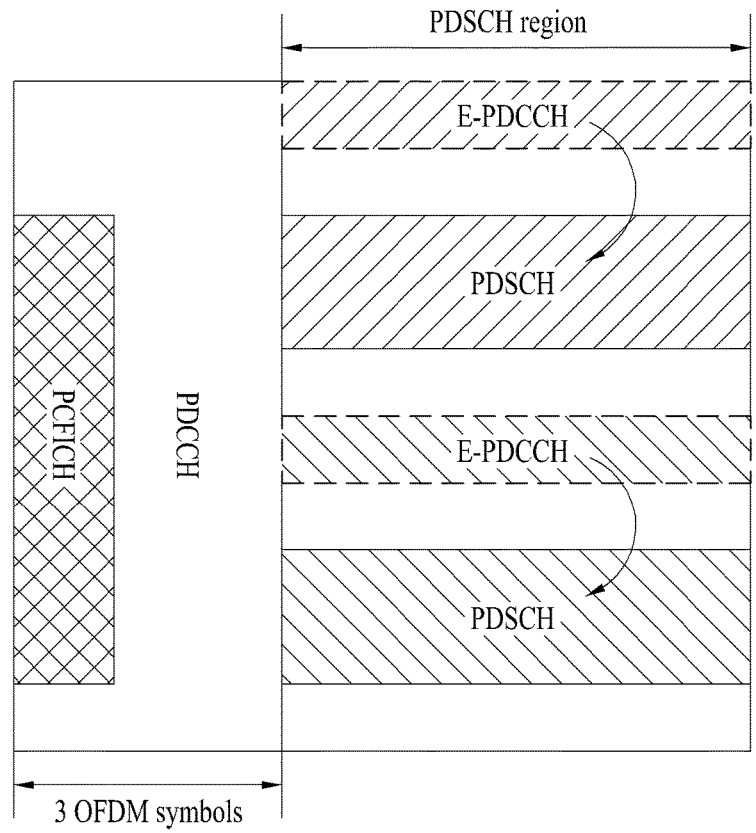
FIG. 10 is a diagram illustrating an example of an EPDCCH and a PDSCH scheduled by the EPDCCH.

FIG. 10 is a diagram illustrating an example of an EPDCCH and a PDSCH scheduled by the EPDCCH.

Referring to FIG. 10, the EPDCCH may be used by partially defining a PDSCH region for transmitting data, and the user equipment should perform a blind decoding procedure for detecting its EPDCCH. Although the EPDCCH performs the same scheduling operation (that is, PDSCH and PUSCH control) as that of the conventional PDCCH, a greater number of EPDCCHs may be allocated to the PDSCH region if the number of user equipments which have accessed the same node as that of RRH. In this case, the number of times for blinding decoding that should be performed by the user equipment may be increased, whereby a problem may exist in that complexity may be increased.

Accordingly, the present invention suggests a method for efficiently configuring a search space of an enhanced control channel (EPDCCH) which is a control channel transmitted from the conventional PDSCH region instead of the conventional legacy PDCCH.

In the present invention, the PDSCH region is defined as a region configured by the other OFDM symbols except for first some OFDM symbols used for legacy PDCCH transmission at a subframe configured by a plurality of OFDM symbols. Also, all OFDM symbols of a specific subframe may be set to the PDSCH region as OFDM symbols used for PDCCH transmission do not exist.

Also, it will be apparent that the EPDDCH which will be described later may be used for communication between a relay and a base station as well as communication between the relay and a general user equipment.

In case of the legacy LTE system, if a cross carrier scheduling method is configured under an environment where a carrier aggregation scheme is used, the user equipment performs blind decoding for DCI (downlink control information) reception of a scheduling cell or a scheduled cell in a previously set PDCCH search space of the scheduling cell or component carrier.

For example, if downlink scheduling information (DL grant) or uplink scheduling information (UL grant), which includes a carrier information field (CIF) for a specific scheduled cell, is detected from the PDCCH search space of the scheduling cell, the user equipment performs a downlink data (PDSCH) reception operation or uplink data (PUSCH) transmission operation in the specific scheduled cell designated by the CIF.

Also, if cross-carrier scheduling is applied under the environment where the carrier aggregation scheme is used, the size of the PDCCH search space of the scheduling cell may be set differently depending on the number of cross-carrier scheduled cells which are previously defined or cell features. In other words, the size of the PDCCH search space of the scheduling cell should be set considering that cross-carrier scheduling operation is performed by a maximum number of cross-carrier scheduled cells which are previously defined at a specific time. Accordingly, if the number of cross-carrier scheduled cells is more increased, the PDCCH search space of the scheduling cell may be set at a relatively great size.

Accordingly, the present invention suggests a method for efficiently configuring a search space of EPDDCH if a carrier cross scheme is applied under an environment where a carrier aggregation scheme is used. Hereinafter, it is assumed that the EPDCCH search space is determined by a resource region of a basic unit which is previously defined. In other words, the size of the EPDCCH search space may be determined by N number of resource block pairs (PRB pair), and may be defined by a specific EPDCCH set.

Figure 11:
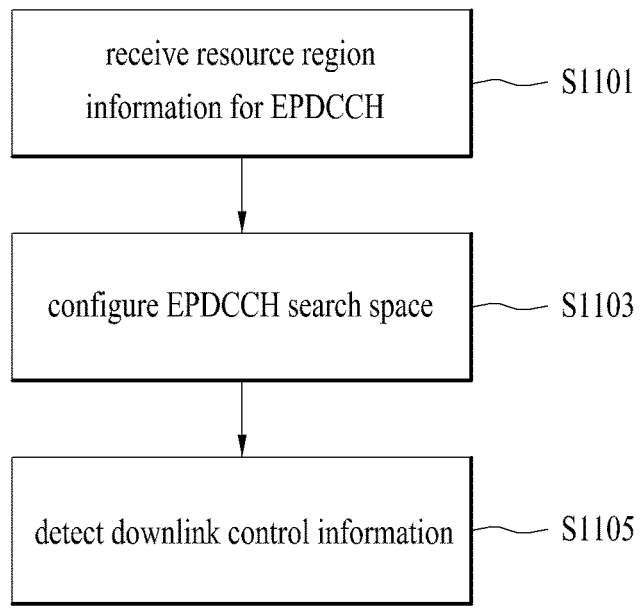
FIG. 11 is a diagram illustrating a method for detecting downlink control information in accordance with one embodiment of the present invention.

FIG. 11 is a diagram illustrating a method for detecting downlink control information in accordance with one embodiment of the present invention.

Referring to FIG. 11, the user equipment receives resource region information for an enhanced physical downlink control channel (EPDCCH) from the base station (S1101).

The user equipment configures at least one resource block as a search space for EPDDCH monitoring on the basis of the resource region information received from the base station or resource region configuration (S1103).

Also, if a cross-carrier scheduling method is applied under the environment where the carrier aggregation scheme is used, configuration of a resource region (for example, N number PRB pairs) of a basic unit, which constitutes a EPDCCH search space of a scheduling cell, may be varied depending on the number of cross-carrier scheduled cells or cell features. In other words, the EPDCCH search space should be configured considering the maximum number of cross-carrier scheduled cells. For example, if the number of cells cross-carrier scheduled through the EPDCCH search space of the scheduling cell is more increased, the resource region of a basic unit, which constitutes the EPDCCH search space of the scheduling cell, may be configured at a relatively great size. By contrast, if the number of cross-carrier scheduled cells is reduced, the resource region of a basic unit, which constitutes the EPDCCH search space, may be configured at a relatively small size.

Also, according to the present invention, the number of PRB pairs constituting a specific EPDCCH set may be set considering a maximum value or minimum value of the number of candidate cells that may be cross-carrier scheduled at a random downlink subframe time of the scheduling cell.

Alternatively, if the number of cells that may actually be cross-carrier scheduled at a random downlink subframe time of the scheduling cell is obtained as N (N is a natural number) number of candidates, candidates of the number of PRB pairs constituting a specific EPDCCH set may be set as N number of candidates through signaling which is previously defined. In the aforementioned example, although the candidates of the number of PRB pairs constituting the specific EPDCCH set are set as N number of candidates, the candidates may be set as a value smaller than or greater than N.

Moreover, according to the present invention, resource region configuration information of a basic unit, which determines the EPDCCH search space, may be notified from the base station to the user equipment or may be updated through one of system information signaling (for example, SIB or PBCH), upper layer signaling, and physical layer signaling, which are previously defined.

The user equipment detects downlink control information by monitoring the search space based on the step S1101 (S1103).

Figure 12:
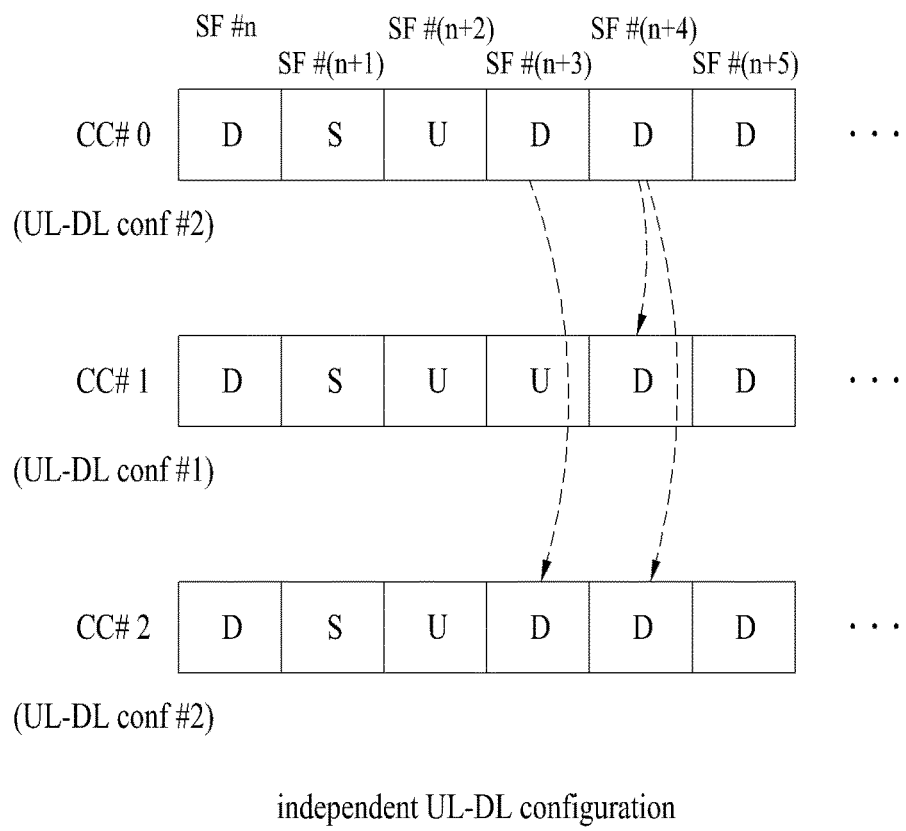
FIG. 12 is a diagram illustrating an embodiment that a carrier aggregation scheme is used in a TDD system and additionally independent uplink-downlink subframe configuration is applied to each cell or component carrier and cross-carrier scheduling is applied in accordance with the present invention.

FIG. 12 is a diagram illustrating an embodiment that a carrier aggregation scheme is used in a TDD system and additionally independent uplink-downlink subframe configuration is applied to each cell or component carrier and cross-carrier scheduling is applied in accordance with the present invention.

In other words, a maximum number of cells which are actually cross-carrier scheduled through the EPDCCH search space of the scheduling cell may be different from the number of cells, which are previously set and totally scheduled, due to configuration of different communication directions for a plurality of cells or a plurality of component carriers in view of a random subframe time.

Referring to FIG. 12, it is assumed that three cells are used on the basis of the carrier aggregation scheme and cross-carrier scheduling is applied and independent uplink-downlink subframe configuration is applied to each cell. In this case, although the subframe of the scheduling cell is configured for downlink communication at a specific time, the other subframes of the same time of the scheduled cells may be configured for uplink communication. Accordingly, downlink communication of cells which are scheduled through the EPDCCH search space of the scheduling cell at the specific time cannot be scheduled.

In other words, in FIG. 12, it is assumed that component carriers (CC) #0 and CC #2 are set to uplink-downlink configuration #2 ("DSUDDDSUDD"), CC#1 is set to uplink-downlink configuration #1 ("DSUUDDSUUD"), CC #0 is a scheduling cell and CC #1 and CC #2 are the cells scheduled by the CC #0.

Under the assumptions, two cells CC #1 and CC#2 are scheduled at SF #(n+4) time, whereas only one cell CC #2 is scheduled at SF #(n+3) time. In other words, a maximum number of cells which are actually cross-carrier scheduled through the EPDCCH search space of the scheduling cell at a specific time may not be the same as the number of cells, which are previously set and totally scheduled (that is, since three cells are used, the number of cells which are totally scheduled is 2).

Accordingly, if the maximum number of cells which are actually cross-carrier scheduled through the EPDCCH search space of the scheduling cell is varied on a time resource region axis, the resource region (for example, N number of PRB pairs) of a basic unit, which determines the EPDCCH search space of the scheduling cell, may be configured differently considering the maximum number of cells which are actually cross-carrier scheduled.

For example, if the maximum number of cells which are actually cross-carrier scheduled through the EPDCCH search space of the scheduling cell at a random time is always smaller than the number of cells, which are previously set and totally scheduled, the resource region (for example, N number of PRB pairs) of a basic unit, which determines the EPDCCH search space of the scheduling cell or EPDDCH search space size, may be configured on the basis of the maximum number of cells which are actually cross-carrier scheduled.

Although the random subframe time has been described as above for description convenience of the present invention, the present invention may equally be applied to even the case where different communication directions are configured for a plurality of cells or a plurality of component carriers.

Also, in the present invention, if the maximum number of cells which are actually cross-carrier scheduled through the EPDCCH search space of the scheduling cell is additionally varied on a time resource region axis, the resource region (for example, N number of PRB pairs) of a basic unit, which determines the EPDCCH search space of the scheduling cell, may be configured independently in a unit of a time resource region which is previously defined. For example, the time resource region unit configured independently in accordance with the present invention may be implemented in a unit of subframe, a plurality of subframes which are previously defined, or a radio frame. Moreover, resource region (for example, N number of PRB pairs) configuration information of a basic unit for determining or updating the EPDCCH search space may be notified from the base station to the user equipment through at least one of system information signaling (for example, SIB or PBCH), upper layer signaling, and physical layer signaling, which are previously defined.

The aforementioned examples of the present invention may be applied to even the case where the EPDCCH search space is implemented on a frequency localized region or frequency distributed region. Also, the present invention may be applied to even the case where a common search space (CSS) or UE-specific search space (USS) of the EPDCCH is configured.

Also, the present invention may be applied to even the case where radio resource usage of a specific cell or specific component carrier is changed dynamically in accordance with the cross-carrier scheduling method under the environment where the carrier aggregation scheme and the cross-carrier scheduling method are applied.

Also, the present invention may be applied to even the case where extension carrier (or new carrier type) is used in accordance with the cross-carrier scheduling method under the environment where the carrier aggregation scheme is applied.

Moreover, information on application of the methods suggested in the present invention and information on rule or configuration may be defined to be shared between the base station and the user equipment through signaling (for example, physical layer signaling or upper layer signaling) which is previously defined, or may be assumed implicitly through a rule which is previously defined.

Figure 13:
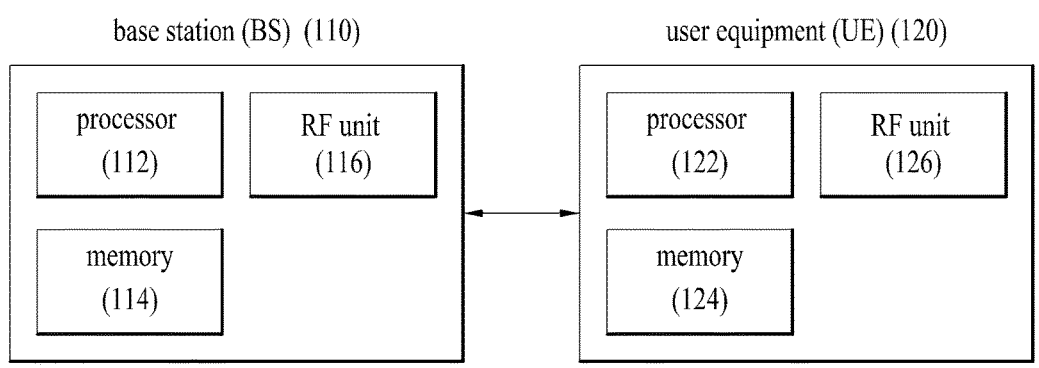
FIG. 13 is a diagram illustrating a base station and a user equipment, which may be applied to the embodiment of the present invention.

FIG. 13 is a diagram illustrating a base station and a user equipment, which may be applied to the embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 13, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for detecting downlink control information in a wireless communication system and the apparatus for the same have been described based on the 3GPP LTE system, the method and apparatus may be applied to various wireless communication systems in addition to the 3GPP LTE system.

The invention claimed is:

1. A method for enabling a user equipment to detect downlink control information in a wireless communication system that supports carrier aggregation (CA), the method comprising:
    receiving setting information indicating cells set for the CA and resource region information for a search space for monitoring an enhanced physical downlink control channel (EPDCCH), from a base station,
    wherein the resource region information indicates a size of a resource region at a subframe determined based on a number of at least one downlink subframe of the cells set for the CA at the subframe, and
    wherein the number of the at least one downlink subframe is varied per subframe according to a time division duplex (TDD) uplink-downlink configuration for each of the cells set for the CA; and
    monitoring the search space of the EPDCCH to detect the downlink control information based on the resource region information.

2. The method according to claim 1, wherein the cells set for the CA include a primary cell including the search space of the EPDCCH and a secondary cell other than the primary cell.

3. The method according to claim 1, wherein the search space is at least one subframe or radio frame.

4. The method according to claim 1, wherein the resource region information is received through at least one of system information signaling, upper layer signaling and physical layer signaling, which are previously defined.

5. A user equipment for detecting downlink control information in a wireless communication system that supports carrier aggregation (CA), the user equipment comprising:
    a radio frequency (RF) unit; and
    a processor,
    wherein the processor:
        receives, through the RF unit, setting information indicating cells set for the CA and resource region information for an enhanced physical downlink control channel (EPDCCH) from a base station,
        wherein the resource region information indicates a size of a resource region at a subframe determined based on a number of at least one downlink subframe of the cells set for the CA at the subframe, and
        wherein the number of at least one the downlink subframe is varied per subframe according to a time division duplex (TDD) uplink-downlink configuration for each of the cells set for the CA, and
        monitors a search space on a scheduling cell to detect the downlink control information based on the resource region information.

6. The user equipment according to claim 5, wherein the cells set for the CA include a primary cell including the search space of the EPDCCH and a secondary cell other than the primary cell.

7. The user equipment according to claim 5, wherein the search space is at least one subframe or radio frame.

8. The user equipment according to claim 5, wherein the resource region information is received through at least one of system information signaling, upper layer signaling and physical layer signaling, which are previously defined.

9. A method for enabling a base station to detect downlink control information in a wireless communication system that supports carrier aggregation (CA), the method comprising:
configuring setting information indicating cells set for the CA and resource region information for an enhanced physical downlink control channel (EPDCCH),
wherein the resource region information indicates a size of a resource region at a subframe determined based on a number of at least one downlink subframe of the cells set for the CA at the subframe, and
wherein the number of at least one downlink subframe is varied per subframe according to a time division duplex (TDD) uplink-downlink configuration for each of the cells set for the CA; and
transmitting, to a user equipment, the setting information and the resource region information.

* * * * *